US011867333B2

United States Patent
Hamkens et al.

(10) Patent No.: US 11,867,333 B2
(45) Date of Patent: Jan. 9, 2024

(54) FLUID COUPLING

(71) Applicant: Stäubli Hamburg GmbH, Norderstedt (DE)

(72) Inventors: Hauke Peter Hamkens, Oldenswort (DE); Jan-Oliver Sylla, Tonning (DE); Eugen Schwarz, Hamburg (DE)

(73) Assignee: Stäubli Hamburg GmbH, Norderstedt (DE)

( * ) Notice: Subject to any disclaimer, the term of this patent is extended or adjusted under 35 U.S.C. 154(b) by 345 days.

(21) Appl. No.: 15/734,739

(22) PCT Filed: Jun. 6, 2018

(86) PCT No.: PCT/EP2018/064921
§ 371 (c)(1),
(2) Date: Dec. 3, 2020

(87) PCT Pub. No.: WO2019/233578
PCT Pub. Date: Dec. 12, 2019

(65) Prior Publication Data
US 2021/0239250 A1    Aug. 5, 2021

(51) Int. Cl.
*F16L 37/373*    (2006.01)

(52) U.S. Cl.
CPC ......... *F16L 37/373* (2013.01); *F16L 2201/20* (2013.01); *Y10T 137/87965* (2015.04); *Y10T 137/87973* (2015.04)

(58) Field of Classification Search
CPC ......... F16L 37/36; F16L 37/44; F16L 37/373; F16L 37/62; F16L 2201/20; F16L 55/1007; Y10T 137/87965; Y10T 137/87973
(Continued)

(56) References Cited

U.S. PATENT DOCUMENTS

| 407,456 A | * | 7/1889 | Williams | F16L 37/373 |
| | | | | 285/379 |
| 625,783 A | * | 5/1899 | Harris et al. | F16L 37/373 |
| | | | | 137/637.05 |

(Continued)

FOREIGN PATENT DOCUMENTS

| CN | 1143997 A | 2/1997 |
| DE | 20314197 U1 | 11/2003 |

(Continued)

OTHER PUBLICATIONS

International Search Report dated Mar. 14, 2019; International Application No. PCT/EP2018/064921.

*Primary Examiner* — Craig J Price
(74) *Attorney, Agent, or Firm* — DINSMORE & SHOHL LLP (57) ABSTRACT

A fluid coupling has two similar coupling halves, each with a rotary body of a valve. A drive device for closing/opening the valve is associated with each rotary body. Each half has a coupling means for connecting/decoupling the halves by relative rotation. Securing means secure the connection when at least one valve is open and close the two rotary valves to disconnect/connect the halves. The drive device is arranged on one half and has a drive shaft which is associated with a valve shaft of the rotary body of the other half. A locking connection is configured which, when the halves are connected, connects the drive shaft on one half to the valve shaft on the other in a non-rotatable/releasable manner such that the rotation of the rotary body is controllable and relative rotation of the halves is blocked but the relative rotation when the valves are closed is permitted.

20 Claims, 5 Drawing Sheets

(58) Field of Classification Search
USPC ............... 137/614.05, 614.06; 251/149.9
See application file for complete search history.

(56) References Cited

U.S. PATENT DOCUMENTS

| | | | | |
|---|---|---|---|---|
| 863,027 | A * | 8/1907 | Gordon | F16L 37/32 |
| | | | | 137/614.02 |
| 2,872,216 | A * | 2/1959 | Kaiser | F16L 37/26 |
| | | | | 251/102 |
| 2,948,553 | A * | 8/1960 | Gill | F16L 37/373 |
| | | | | 137/614.02 |
| 3,159,180 | A * | 12/1964 | Courtot | F16L 37/373 |
| | | | | 137/614.06 |
| 4,351,351 | A * | 9/1982 | Flory | F16L 55/1015 |
| | | | | 251/149.7 |
| 4,438,779 | A * | 3/1984 | Allread | F16L 37/113 |
| | | | | 285/85 |
| 4,664,169 | A | 5/1987 | Osaka et al. | |
| 4,687,016 | A * | 8/1987 | Takahashi | F16L 37/002 |
| | | | | 137/240 |
| 4,881,573 | A | 11/1989 | Durant et al. | |
| 5,332,001 | A * | 7/1994 | Brown | F16L 37/36 |
| | | | | 251/96 |
| 5,402,825 | A * | 4/1995 | McCracken | F16L 37/373 |
| | | | | 137/614.01 |
| 5,507,313 | A | 4/1996 | LeDevehat | |
| 6,056,011 | A * | 5/2000 | Bormioli | F16L 55/1007 |
| | | | | 137/614.01 |
| 6,454,314 | B1 | 9/2002 | Grosspietsch et al. | |
| 8,082,947 | B2 * | 12/2011 | Chang | F16K 31/535 |
| | | | | 251/249 |
| 8,967,177 | B2 * | 3/2015 | Haunhorst | F16L 37/36 |
| | | | | 137/614.01 |
| 10,625,068 | B2 * | 4/2020 | Leuthardt | A61M 39/10 |

FOREIGN PATENT DOCUMENTS

| | | |
|---|---|---|
| EP | 0489368 A1 | 6/1992 |
| EP | 0381069 B1 | 10/1993 |
| EP | 0995938 B1 | 3/2005 |
| WO | 2009053011 A1 | 4/2009 |
| WO | 2010125442 A1 | 11/2010 |

* cited by examiner

FLUID COUPLING

CROSS REFERENCE TO RELATED APPLICATIONS

This application is the U.S. National Stage of PCT/EP2018/064921 filed Jun. 6, 2018, the entire content is incorporated herein by reference in its entirety.

FIELD OF THE INVENTION

The invention relates to a fluid coupling comprising two coupling halves which are releasably connected on their coupling sides, each coupling half having a coupling housing, being equipped with a rotary valve, being aligned along a coupling axis, and being formed correspondingly similar to each other in such a manner that each rotary valve has a rotary body mounted on the coupling housing so as to be rotatable about a valve axis, which is directed transversely to the coupling axis, and a fluid passage which traverses this rotary body, said fluid passage closing and opening the rotary valve depending on controllable rotational positions of the rotary body about the valve axis, that a drive device, which is associated in each case with one of the rotary bodies for controlling its rotational position, is arranged on each coupling half, that each coupling half is equipped with a coupling means which connects the coupling halves, wherein the connection can be established releasably for uncoupling and vice versa for coupling by relative rotational movement of the coupling halves about the coupling axis, and that the coupling halves have securing means which block the relative rotational movement for securing the connection of the coupling halves when at least one rotary valve is open and which secure the closure of the two rotary valves for disconnecting and correspondingly for connecting the coupling halves.

The invention also relates to a coupling half of a fluid coupling, wherein the coupling half, which has a coupling housing with coupling side and housing axis, is an independent coupling part for joining the fluid coupling to a similar coupling part formed by the corresponding coupling half, and wherein the coupling half has a rotary valve with a rotary body rotatably supported on the coupling housing, a fluid passage passing through the rotary body and the rotational position of which being controllable for opening and closing of the fluid passage and thus of the rotary valve. The coupling housing is formed in particular by a circular cylindrical basic body with a correspondingly cylindrical cavity which forms a flow path in which the rotary body is located.

The rotary valves are usually designed as ball valves with valve balls or plug valves with rotary cones as rotary bodies. It is typical for such fluid couplings with rotary valves that the rotary bodies are actuated individually and therefore sequentially after connecting the coupling halves. The fluid coupling is used for the sealing connection of pipes and/or tanks to transport or convey liquid or gaseous media as fluid. The rotary body is driven in each case by a switching shaft which is a drive shaft and is usually brought from the closed rotational position to the open rotational position or vice versa by a 90° rotation. The drive shaft is driven either manually by way of a handle or automatically by a suitable motorised means. The fluid coupling must be secured against incorrect operation. This means that when the rotary valves are closed, in each case the drive of the rotary body must be closed as long as no coupling partner forming the one or the other coupling half is connected, and that in addition the connection of the coupled coupling halves must be secured as long as one of the rotary valves is still open.

BACKGROUND OF THE INVENTION

Securing gears integrated in the coupling housing are known (e.g. WO 2010/125442 A1; DE 203 14 197 U1) which cooperate in each case with the drive shaft of the rotary valve. To prevent accidental disengagement of the coupling connection, when the rotary body in each case is rotated into the rotational position which opens the rotary valve, a gear pin parallel to the housing axis on the coupling side of the coupling half is protrudingly extended by means of the securing gears, the pin engaging in a locking recess formed on the opposing coupling half. To secure the rotational movement of the drive shaft of the rotary body in each case when the rotary valve is closed and in the absence of a coupling connection, it is known to additionally mount a spring-loaded, axially parallel second locking pin in each coupling housing, which protrudes in a spring-loaded manner on the coupling side when the coupling halves are disconnected from each other and in this state is in locking engagement with the drive shaft in order to block its rotation. When the coupling halves are joined together, the second locking pin is pushed back into the coupling housing, thus releasing the drive shaft for rotation. The known securing means require considerable effort with regard to production and construction with a plurality of individual parts and functional surfaces in each coupling housing. In particular, special holes, gear parts, gearings and spring accumulators must be formed and accommodated in the wall of each coupling housing. This results in wear and significant susceptibility to operational malfunctions. The plurality of components increases production costs. This hampers serial production with high production speed.

SUMMARY OF THE INVENTION

The object of the invention is to provide simple drives of the rotary valves and at the same time to simplify and improve securing means for securing the rotational movement of the two coupling halves about the coupling axis in the coupled state of the fluid coupling and also to secure the rotational movement of the rotary bodies of the rotary valves when the rotary valves of the coupling halves, which are disconnected from the fluid coupling, are closed. The simplification is intended to eliminate wear parts from securing means of customary fluid couplings. In addition, the simplification should also be linked to fast assembly and simplified design and therefore cost-effective production of the coupling halves.

The objectives are achieved according to the invention in conjunction with the features of the fluid coupling referred to hereinbefore in that the drive device which is arranged in each case on the one coupling half has a drive shaft which in each case is associated with a valve shaft of the rotary body of the rotary valve of the other coupling half, a locking connection in each case being configured which, when the coupling halves are connected to each other, connects the respective drive shaft on the one coupling half to the respective valve shaft on the other coupling half in a non-rotatable and releasable manner such that the rotational position of this rotary body is controllable thereby and the relative rotational movement of the coupling halves about the coupling axis is blocked, but the relative rotational movement when the rotary valves are closed is permitted. Similarly, the objectives are achieved in conjunction with the features of a coupling housing referred to hereinbefore, in that a switchable drive device is arranged and configured on the coupling half, which device has a drive shaft for controlling drive connection and securing connection to a valve shaft of a rotary body of a rotary valve of a correspondingly similar connectable coupling half, and in that the rotary valve associated with the coupling half has a valve shaft exposed on the outside of the coupling housing for drive connection and securing connection to a correspondingly controlling drive device of the correspondingly similar coupling half.

According to the invention, this achieves a number of advantages. In each case with the arrangement of the drive device on the one coupling half for switching, i.e. for driving the rotary valve of the other coupling half, it is achieved according to the invention that the drive shaft of the rotary valve of the one coupling half in each case is the switching element with which the valve shaft of the other coupling half is actuated. The result of this design is that the switching positions, i.e. the rotational positions of the rotary bodies are reciprocally controllable in a simple manner when the coupling halves are interconnected, i.e. coupled. It is achieved that in each case switching the drive shaft of the one coupling half determines the valve state of the other coupling half such that reciprocal switching and control connection is directly determined by the coupled state of the coupling halves without customarily required securing parts. This means that, when using the two drive devices, each of the coupling halves relies on the presence of the opposing coupling half for secure switching. It can be achieved in a simple manner that, merely by establishing the two switching connections between the two coupling halves, they can be secured against rotational movement about the coupling axis in the coupled state and also that this rotational movement for decoupling or coupling the coupling halves is only permitted if each of the rotary valves is in the closed state. According to the invention, in each case only the locking connection of the drive device is required on the one coupling half with the rotary body on the other coupling half. In each case, the drive shaft on the one coupling half is non-rotatably and releasably connected to the valve shaft of the other coupling half. As this connection only enables the relative rotational movement of the coupling halves about the coupling axis when the rotary valves are closed, it is achieved that the rotary valves of the coupling halves disconnected from the fluid coupling are securely closed and can only be readily opened using the locking connections arranged crosswise after joining to form the fluid coupling. The locking connections thus form simple securing means both for securing the coupling connection and also for securing the closed rotary valves of the coupling halves disconnected from the fluid coupling. Customary gear parts which form wear parts are eliminated. An optimum production time is achieved, particularly in mass production, with relatively low production costs and improved service life.

The correspondingly similar embodiment of the coupling halves means that there is conformity regarding the type of rotary valves, drive devices and coupling means. This means that the invention initially covers completely identical coupling halves and thus a so-called unisex coupling. For example, the coupling sides can also be configured with different sealing surfaces, for example to obtain a vacuum-capable coupling. It is also possible for rotary bodies to be asymmetrical so that they interlock to form a dry coupling when the coupling halves are connected and the rotary valves are opened.

One embodiment of the fluid coupling consists in that in each case the drive device on the one coupling half has a drive connection piece fixed to the coupling housing, which drive connection piece rotatably supports the drive shaft about a drive axis that is directed transversely to the housing axis of the coupling half, and in that the valve shaft is exposed outside on the coupling housing of the other coupling half for driving the rotation of the rotary body of the associated rotary valve, wherein the drive shaft and the valve shaft, which are each components of the same coupling housing, are arranged offset at a peripheral angle to each other, in each case the drive connection piece supporting the drive shaft, which drive connection piece is fixed to the one coupling housing, protruding so far beyond the other coupling housing on the outside along the housing axis that the locking connection is established there when the two coupling halves are releasably connected. From a production point of view, the drive connection pieces can be easily produced as preferably integrally formed components of the coupling housing. The drive connection pieces can be produced as flat lugs with a concave internal contour which are adapted to the corresponding convex external contour of the particularly cylindrical coupling housing that they partially overlap. The peripheral angle at which the drive shaft and the valve shaft are offset on each coupling housing is 180° in order to form the drive connection pieces on the housing circumference transversely to the housing axis as preferably large-area curved surface segments, which are advantageously adapted in shape to the cylindrical shape of the coupling housing, and also to provide the drive connection pieces of the two coupling halves with a matching circumferential arrangement.

A particularly advantageous and preferred embodiment consists in that in each case the drive connection piece of the drive device of the one coupling half is configured as a coupling dog, forming a component of the associated coupling means, with a gripping edge which releasably engages behind an associated radial projection on the coupling housing of the other coupling half to releasably connect the coupling halves while clamping the coupling sides to one another, the gripping edge and the radial projection forming a dog connection pair and it being possible to engage and correspondingly disengage them by the relative rotational movement of the two coupling halves about the coupling axis for clamping the two coupling halves to one another. This embodiment achieves another substantial advantage. The drive connection pieces are not only components of the drive devices, at the same time they also form two coupling dogs of the fluid coupling. As a result, preferably only a single coupling dog, which is an integrated component of the drive device, is provided on each coupling half. A further considerable simplification is achieved in respect of the design and production of the coupling halves which also match the coupling dogs. In contrast, customary fluid couplings of said type generally have two coupling dogs per coupling half.

The invention is not limited to the drive connection pieces being configured as components of the coupling means or only being formed thereby. Thus, it is also possible that, for forming the coupling means, each coupling half is provided with customary corresponding coupling elements which cooperate due to segment-like, dog-like, axis-parallel projections and complementary recesses in order to engage locking surfaces of these parts, thereby pulling the coupling halves firmly against each other. However, such a known bayonet-type connection of the coupling halves obstructs the structural arrangement of an interface seal as well as a valve seal on the coupling side which are to be arranged in the radial region between the dogs. The result is that the rotary body of the rotary valve is to be offset into the coupling housing in the axial direction by a certain amount in order to achieve sufficiently pressure-bearing wall thicknesses. This also has the effect that a residual amount of the fluid, which arises between the rotary valves in the fluid coupling when they are closed, is increased. According to the invention, this impairment can easily be eliminated by providing the drive connection pieces as coupling dogs instead of the customary bayonet-type coupling means which are also technically complex to produce. Using this very simple dog connection, the rotary bodies can be brought relatively close to the coupling side and thus to the disconnecting point to reduce the accumulation of residue, it also being possible to keep the cross-sectional diameter of the coupling half relatively small to maintain the required wall thicknesses.

Advantageously, a housing base is formed on the outside of the coupling housing, which housing base accommodates the valve shaft of the rotary body in a recessed position.

A further simplified and particularly compact embodiment in production engineering terms consists in that, on each coupling half, the radial projection of the coupling means is formed by a rear base edge of a housing base, directed away from the coupling side transversely to the housing axis, which accommodates the valve shaft. Transverse edges of the drive connection pieces, which form radial projections open at the ends, can form the gripping edges. Gripping edges as radial projections can also be provided on the inside of the drive connection pieces for engaging behind corresponding parts on the coupling housing. With such an embodiment, it is achieved that the two dog connection pairs are arranged in the region between the two locking connections, and can be provided in particular close to the coupling side in a vertical plane parallel thereto.

Advantageously, special measures can be provided in order to specially fix the coupling connection with the coupling dogs, which are formed by the drive connection pieces, and make it rigid. One advantageous measure consists in that, for centring the connection of the coupling halves, each of the two dog connection pairs is centred conically, the gripping edge and the associated radial projection being directed backwards, transversely to the coupling axis and obliquely outwards and, pointing away from the coupling side, thus fitting snugly into each other. For radial centring of the coupling halves, a housing outer edge can also be formed in each case on the coupling side end of the one coupling housing, which housing outer edge fits snugly into a complementary inner edge of the drive connection piece arranged on the other coupling housing.

According to an advantageous embodiment, in each case the drive connection piece of the one coupling half is formed by a surface segment which extends at least substantially over a quarter of a cylindrical transverse circumference of the coupling housing and which is associated with a corresponding free peripheral region on the outside of the coupling housing to connect the coupling halves to the respective other coupling half. A particularly advantageous embodiment for connecting the coupling halves is achieved in conjunction with the offset arrangement of drive shaft and valve shaft or the drive connection pieces on the fluid coupling at a peripheral angle of 180°. The coupling halves can thus be brought together in that they first slide against each other in the direction of the coupling axis with maximum rotational movement of the coupling halves about the coupling axis, along axis-parallel, free longitudinal edges of the drive connection pieces until the coupling sides strike each other in the separating plane. It is then only necessary to carry out a rotational movement by exactly or approx. 90° about the coupling axis to bring the coupling halves into the coupled connection with locking connections produced thereby.

Advantageously, the locking connection in each case is formed by a positive-fit connection to connection partners forming locking elements arranged on the drive device and on the rotary body associated with the drive. The non-rotatable and releasable connection is achieved particularly easily in that the connection partners of the positive-fit connection are formed by at least one spring element and at least one first groove, associated therewith, which is non-rotatably connected to the rotary body associated with the locking connection. The at least one spring element is held captive in the at least one first groove when the coupling halves are connected and locked against their relative rotational movement, whereby the rotational movement of the coupling halves about the coupling axis is blocked. Advantageously, at least one second groove, which is formed on the coupling housing in a stationary manner, is provided and is aligned with the at least one first groove only in a rotational position of the at least one first groove which pertains to the closed position of the associated rotary valve in the circumferential direction transversely to the coupling axis, it being possible to guide the at least one spring element through the at least one aligned second groove to leave and to establish the captive holding connection and thus to enable the relative rotational movement of the coupling halves about the coupling axis. Advantageously, the locking connection in each case is formed with a stop abutment which limits the relative rotational movement of the coupling halves about the coupling axis in a defined manner to establish the coupling connection.

The first groove is advantageously formed as a particularly convexly curved through-slot in a circular front face of the valve shaft. The valve shaft, which is circular in cross-section, is then located in a housing recess with corresponding cross-section.

The positive-fit connection can also be provided with a coding which is individualised by the shape configuration of the connection partners. The coding consists in that the connection partners have shapes adapted to one another which belong together in the manner of a key/lock connection. Accordingly, only coupling halves which belong together can be coupled together. For example, the coding is formed by the slotted groove with snugly fitting flat spring. Another example is a triangular or wedge-shaped groove in the end face of the valve shaft with associated, appropriately shaped spring of the locking connection, which forms a stop abutment in particular due to its taper and/or a ridge.

On each coupling half, the fluid passage of the rotary body and the locking connection can be adapted to each other particularly easily to set switching angles. The fluid passage is preferably arranged such that the rotary valve is closed at least up to a switching angle of 10°, the switching angle being the angle by which the rotary body can be rotated about its valve axis from the rotational position when there is free relative rotational movement of the coupling halves to open the rotary valve, the rotary valve being fully opened at the switching angle of 90°.

Only particularly expedient and advantageous embodiments or embodiment options will be described in greater detail, based on the following description of the embodiments illustrated in the schematic drawing. Each individual or detail design described within an embodiment should be understood as a structurally independent detail example for other embodiments and designs which fall within the invention that are not described or not fully described. Designs or features which have a higher-level independent relevance are highlighted in particular by the term "general".

DETAILED DESCRIPTION OF THE PREFERRED EMBODIMENT

Figure 1:
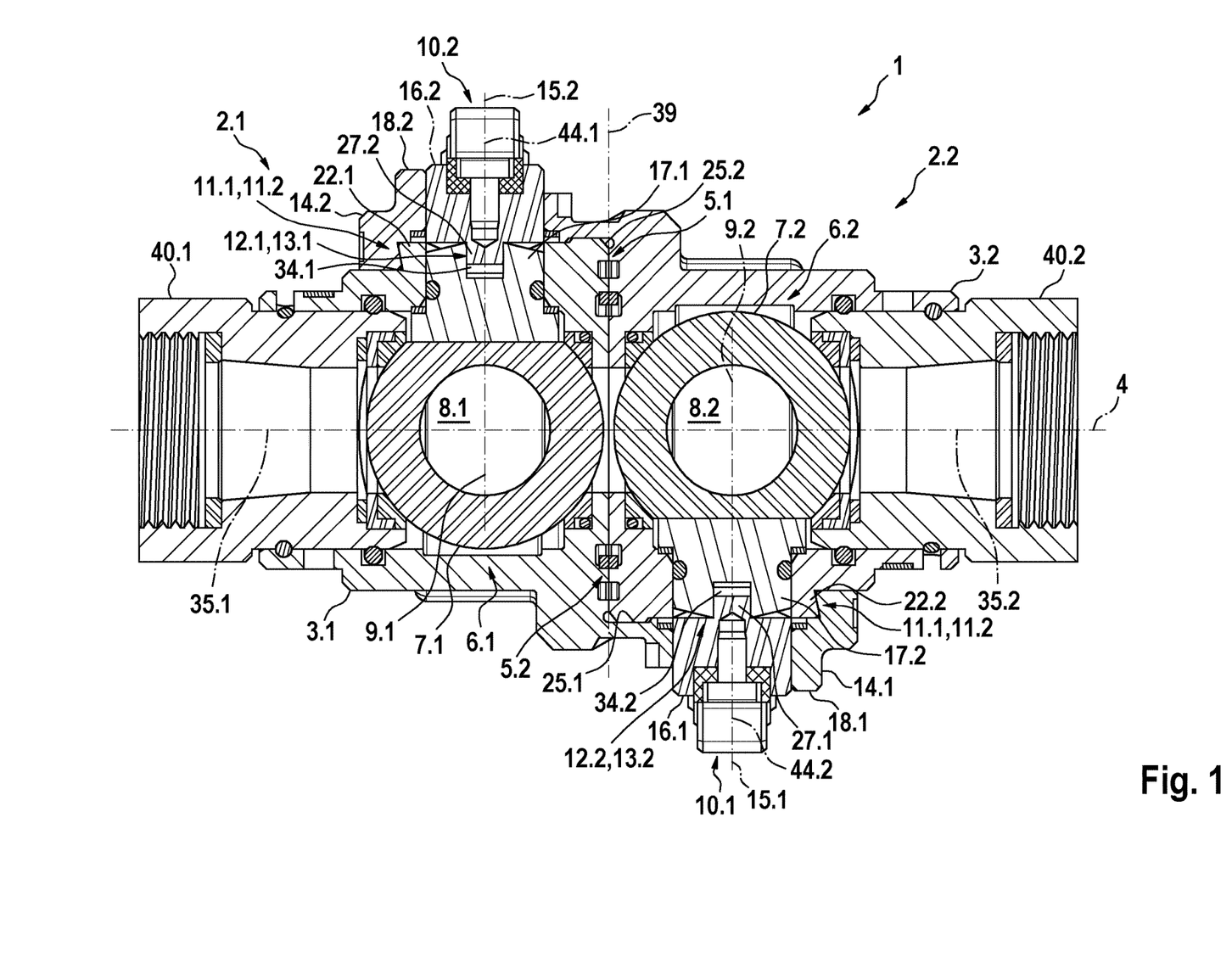
FIG. 1 is a central longitudinal sectional view of a fluid coupling according to the invention in releasable coupling connection of two similar coupling halves with closed rotary valves.
Figure 2:
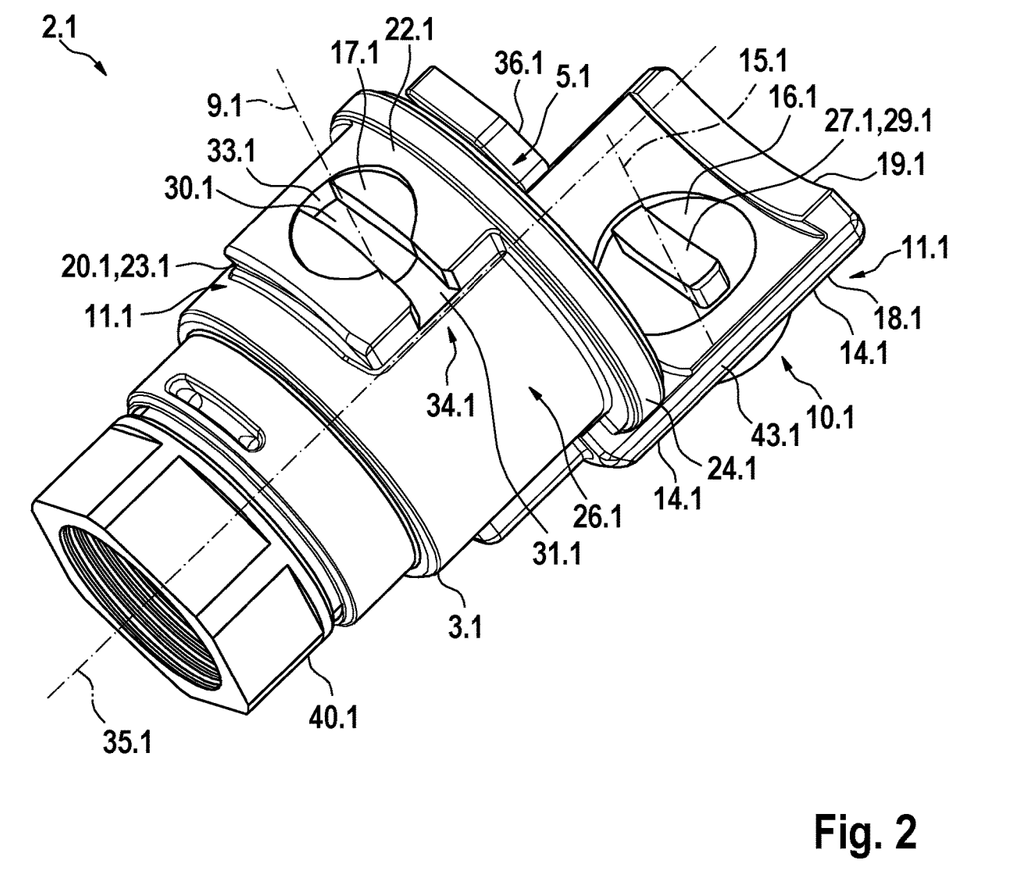
FIG. 2 is a axonometric projection view of a coupling half with closed rotary valve disconnected from the fluid coupling according to FIG. 1.

An inventive fluid coupling 1 according to FIG. 1 is generally assembled from two similar coupling halves 2.1 and 2.2 symmetrical along a separating plane 39. In the fluid coupling 1, housing axes 35.1/35.2 of the two coupling halves 2.1/2.2 coincide with a central coupling axis 4. FIG. 2 shows the left-hand of the two coupling halves in FIG. 1 with the number 1 added to the reference numbers. The second coupling half 2.2, on the right in FIG. 1 and identical in the embodiment, is described, as in the other associated figures, with reference numbers provided with the additional number 2.

Although the coupling halves 2.1/2.2 in the embodiment are completely identical, the description of the locking connections 13.1/13.2 according to the invention applies equally and generally to coupling halves according to the invention with rotary valves, in which the coupling halves are formed on their coupling sides, for example, with different sealing means or with rotary bodies of rotary valves which interlock for connecting. Coupling connection parts of the coupling halves, such as nozzles for pipes, tanks or the like, may also be of different design.

In the embodiment, each coupling half 2.1/2.2 has a rotary valve 6.1/6.2 with a rotary body 7.1/7.2 in the form of a valve ball. The rotary body 7.1/7.2 is rotatably supported on a coupling housing 3.1/3.2, which has circular cylindrical sections, about a valve axis 9.1/9.2 which is directed perpendicular to the housing axis 35.1/35.2. The housing axis 35.1/35.2 is the cylinder axis of the coupling housing 3.1/3.2. Each coupling half 2.1/2.2 has a coupling connection part 40.1/40.2 which is fitted into the coupling housing 3.1/3.2 in a sealed manner. Axis-parallel passage spaces of the coupling housing 3.1/3.2 and the coupling connection part 40.1/40.2 define a flow path for the fluid in which the rotary body 7.1/7.2 is arranged.

In the embodiment, the coupling connection part 40.1/40.2 is fitted with a screw thread for screw connection to a pipe not illustrated here. The one coupling housing 3.1/3.2 of the one coupling half 2.1/2.2 has a coupling side 5.1/5.2 for coupling connection to the other similar coupling half 2.2/2.1 provided as the mating part. Parts fitted into each other as well as parts of each coupling half 2.1/2.2 which are movable with respect to each other are sealed against fluid passage using conventional sealing means such as gaskets.

The rotary body 7.1/7.2 has a fluid passage 8.1/8.2 passing through it. Depending on the rotational position of the rotary body 7.1/7.2 about the valve axis 9.1/9.2, the rotary valve 6.1/6.2 is either open, when the fluid passage 8.1/8.2 is aligned parallel to the housing axis 35.1/35.2, i.e. axis-parallel, or closed, when the fluid passage 8.1/8.2 is brought into a position transverse and finally perpendicular to the housing axis 35.1/35.2 or to the fluid path. When the rotary valves 6.1/6.2 are open, the flow path through the fluid coupling is enabled.

The rotary body 7.1/7.2 can generally be rotatably supported about the valve axis 9.1/9.2 on the coupling housing 3.1/3.2 in any suitable manner with bearing shafts, such as journals or the like, which are non-rotatably connected to the rotary body 7.1/7.2. A bearing shaft of the shaft bearing is formed by a valve shaft 17.1/17.2, by means of which the rotary body 7.1/7.2 can be rotated, i.e. can be switched, about the valve axis 9.1/9.2 into the closed position and the open position of the rotary valve 6.1/6.2.

According to the invention, a drive shaft 16.1/16.2 is formed in a special manner as a component of a drive device 10.1/10.2 and the locking connection 13.1/13.2. Substantial features of the locking connection 13.1/13.2, which are generally defined by interconnected locking elements, can be seen in particular from FIG. 1, FIGS. 3A and B as well as FIGS. 4A and B. Arranged on each coupling half 2.1/2.2 is one of the drive devices 10.1/10.2 with associated drive shaft 16.1/16.2 for connection to the valve shaft 17.2/17.1 of the respective other coupling half 2.2/2.1.

Figure 3A:
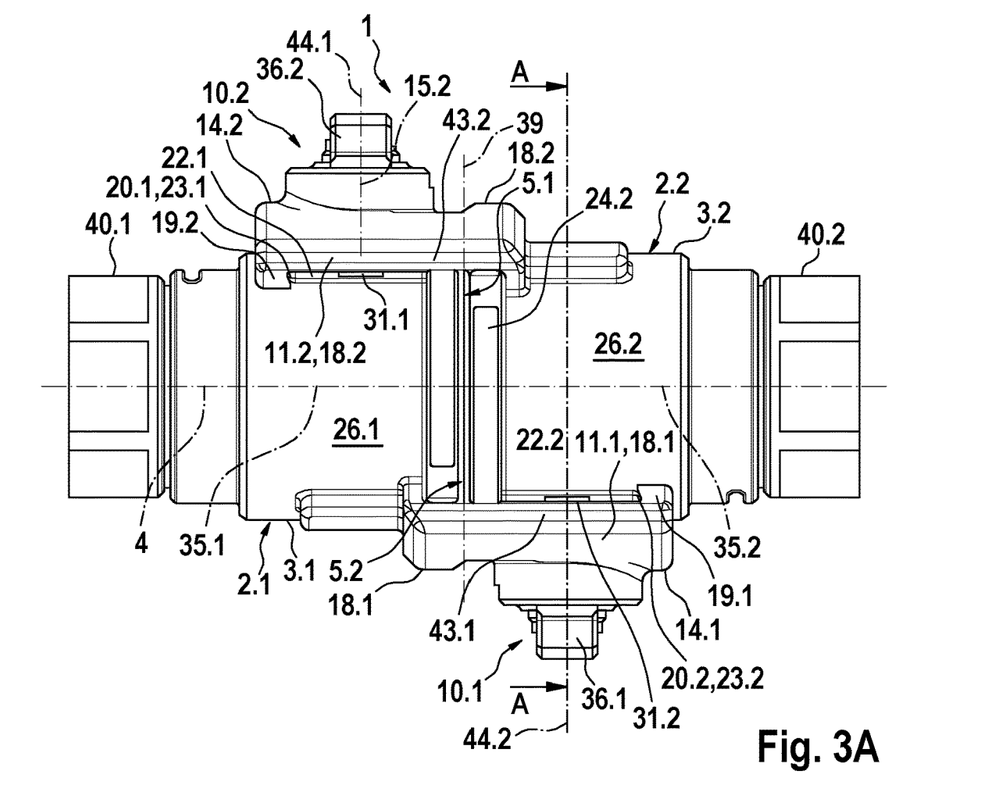
FIGS. 3A and 3B are a longitudinal sectional view of the fluid coupling according to FIG. 1 and a cross-sectional view according to A-A through a locking connection on one of the coupling halves with closed rotary valve.
Figure 3B:
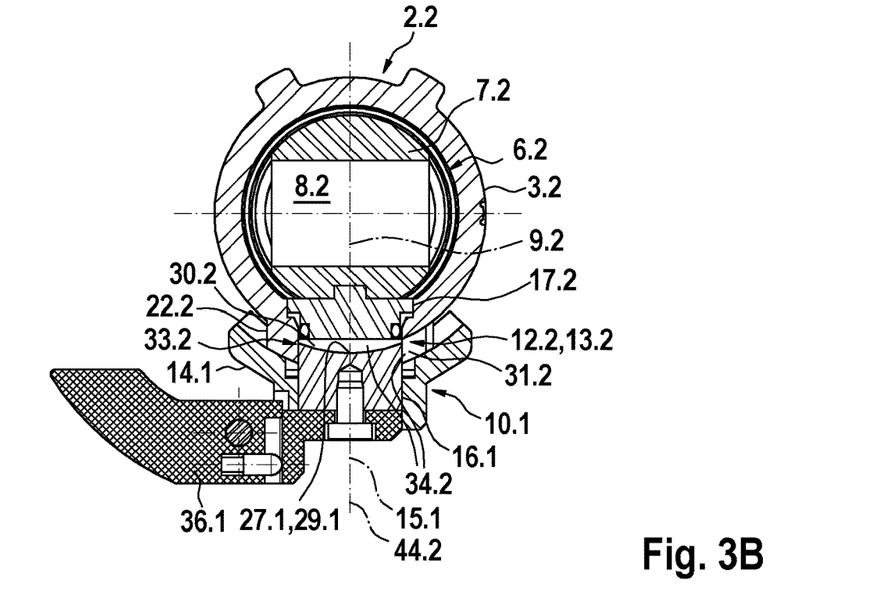

FIGS. 3A and 3B as well as 4A and 4B show in greater detail the drive device 10.1 which is arranged on the coupling half 2.1 and is associated with the rotary valve 6.2 of the coupling half 2.2. The drive device 10.1 has the drive shaft 16.1 which is associated with the valve shaft 17.2 of the rotary body 7.2 of the rotary valve 6.2. On the coupling half 2.2, this association includes the locking connection 13.2 which, when the coupling halves 2.1/2.2 are interconnected, connects the drive shaft 16.1 non-rotatably to the valve shaft 17.2. By means of this connection, the rotational positions of the rotary body 7.2 can be controlled by means of the drive device 10.1 arranged on the coupling half 2.1, and in addition a relative rotational movement of the coupling halves 2.1/2.2 about the coupling axis 4 is blocked but the relative rotational movement when the rotary valve 6.1/6.2 are closed is permitted.

The drive device 10.1 generally has a drive connection piece 14.1 fixed to the coupling housing 3.1 which protrudes parallel to the housing axis 35.1 and consequently also parallel to the coupling axis 4 in front of the coupling side 5.1 and supports the drive shaft 16.1, as can be seen in particular from FIG. 2. The drive shaft 16.1 is so far distant from the separating plane 39 or the coupling side 5.1 that it is located with the valve shaft 17.2 in a common connection plane 44.2 perpendicular to the coupling axis 4. The drive shaft 16.1 of the controlling drive device 10.1 has a first locking element 27.1 which can be non-rotatably connected (FIG. 2) and is non-rotatably connected (FIG. 1, FIGS. 3A and 3B, FIGS. 4A and 4B) to the valve shaft 17.2 of the coupling half 2.2 for rotational movement, which first locking element can be put into the defined rotational position which closes the rotary valve 6.2, only in which the locking connection 13.2 to the valve shaft 17.2 can be established and released.

The valve shaft 17.2 of the rotary body 7.2 of the rotary valve 6.2 has a second locking element 34.2 which is configured to establish the captive locking connection 13.2 to the first locking element 27.1 of the coupling half 2.1, which opens the rotary valve 6.2 and can only be released when the rotary valve 6.2 is closed.

The first locking element 27.1 is generally configured to establish a positive-fit connection to the second locking element 34.2 of the coupling half 2.2. The first locking element 27.1 is a spring element 29.1 formed on the drive shaft 16.1 of the drive device 10.1. The second locking element 34.2 has an associated first groove 30.2 for establishing the positive-fit connection to the spring element 29.1, which groove is formed on the valve shaft 17.2 which rotatably supports the rotary body 7.2 and is exposed therewith on the outside of the coupling housing 3.2. The first groove 30.2 is formed by a through-slot which is configured in the front face of the valve shaft 17.2 which is circular in cross-section. The second locking element 34.2 has a second groove 31.2 which is stationary on the coupling housing 3.2, is open to the outside and is configured as a transverse groove, i.e. directed perpendicular to the housing axis 35.2, which only aligns with the first groove 30.2 in a correspondingly transversely directed rotational position of the valve shaft 17.2, namely in the rotational position of the rotary body 7.2 which closes the rotary valve 6.2. In the positive-fit connection, the first locking element 27.1/27.2 with concave surfaces is generally adapted to corresponding convex surfaces of the second locking element 34.2/34.1.

FIGS. 3A and 3B as well as FIG. 1 show the rotary valve 6.2 in the closed position. In this position, the spring element 29.1 of the drive shaft 16.1 is located in a plane transverse or perpendicular to the flow path or the housing axis 35.2. The spring element 29.1 aligns the first groove 30.2, which is introduced into the free end face of the valve shaft 17.2, in the same circumferential direction transverse to the housing axis 35.2 on the circumference of the coupling housing 3.2, the rotary valve 6.2 being closed. In this rotational position of the valve shaft 17.2, the first groove 30.2 aligns with the second stationary groove 31.2. It is thus achieved that the two coupling halves 2.1/2.2 can be rotated with respect to each other about the coupling axis 4. Release of the spring element 29.1 from the first groove 30.2 can only take place in one direction through the second groove 31.2 or in the reverse direction for insertion into the first groove 30.2, as the first groove 30.2 is closed with a stop abutment 33.2 on the side opposing the second groove 31.2.

Figure 4A:
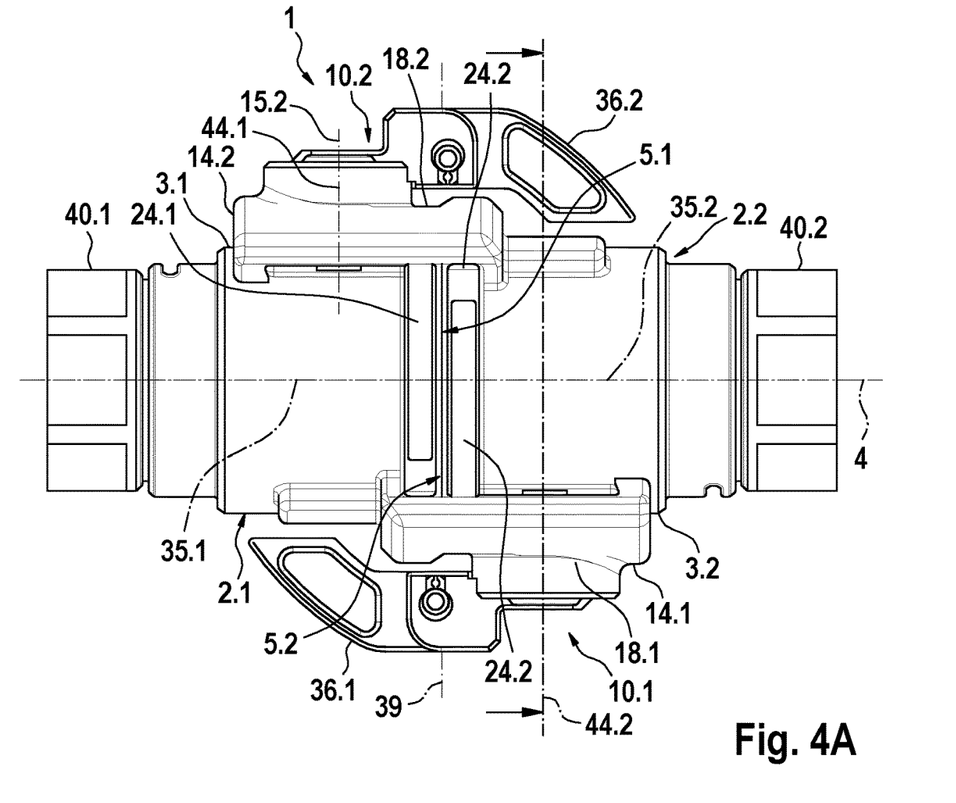
FIGS. 4A and 4B are a longitudinal sectional view of the coupling half according to FIG. 1 and a cross-sectional view according to B-B through the locking connection with open rotary valve.
Figure 4B:
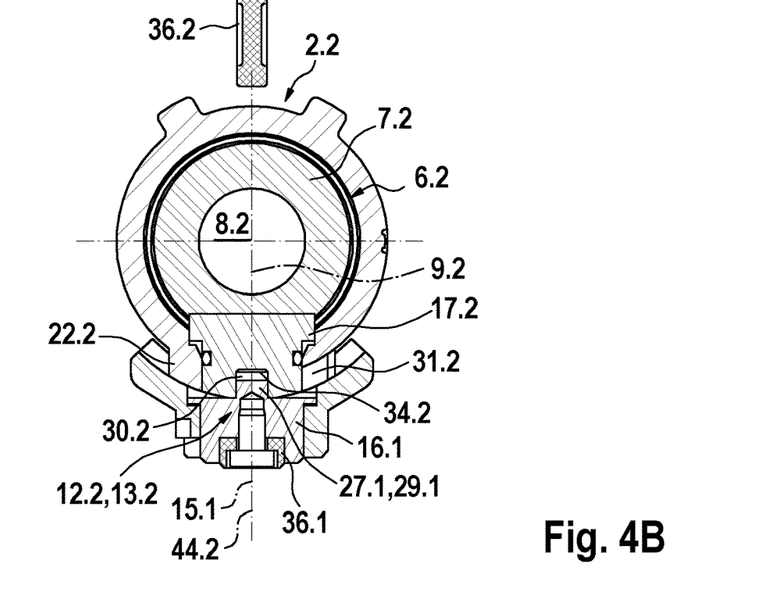

The spring element 29.1 is held captive in the first groove 30.2 when the coupling halves are connected and blocked against their relative rotational movement about the coupling axis 4. The captive holding connection is formed in that the valve shaft 17.2 and thus the first groove 30.2 is located in a chamber-like recess of a housing base 22.2 which forms a padding. The cross-section of the recess corresponds to the cylindrical circular cross-section of the valve shaft 17.2. With the exception of the rotational position of the valve shaft 17.2, in which the first groove 30.2 aligns with the second groove 31.2, the first groove 30.2 remains closed laterally by the edge of the recess. In the rotational position of the rotary body 7.2 associated with the closed first groove 30.2, the coupling halves 2.1/2.2 are joined together to form the fluid coupling 1. FIGS. 4A and 4B show the fluid coupling 1 with the fully open rotary valve 6.2 and the associated position of the locking connection 13.2. In the aligned position of the grooves, the recess edge forms the stop abutment 33.2 which limits the relative rotational movement of the coupling halves 2.1/2.2 about the coupling axis 4 in a defined manner for connection.

In each case, the drive shaft 16.1/16.2 is non-rotatably connected, by a screw connection in the embodiment, to an actuating means 36.1/36.2 which is formed in the embodiment by an actuating handle. With this actuating means 36.1/36.2 on the one coupling half 2.1/2.2, the rotary valve 6.1/6.2 on the corresponding other coupling half 2.2/2.1 is thus rotatably operated and therefore switched. The actuating means can be provided by a motorised means such as an actuator for automatic operation.

The drive device 10.1 and the locking connection 13.2, as shown with FIGS. 3B and 4B on the second coupling half 2.2, have been described above. It is part of the invention that the drive device 10.2 and the locking connection 13.1 on the coupling half 2.1 are designed and configured exactly as can be seen in particular from FIGS. 1 and 2.

Figure 5A:
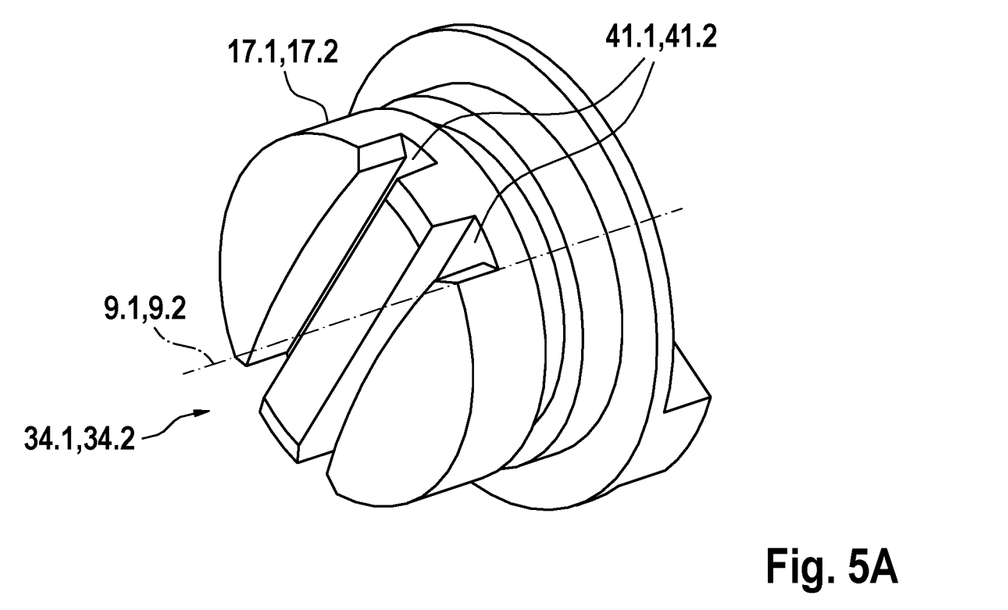
FIGS. 5A and 5B are perspective views of embodiments of valve shafts of locking connections of coupling halves according to the invention.
Figure 5B:
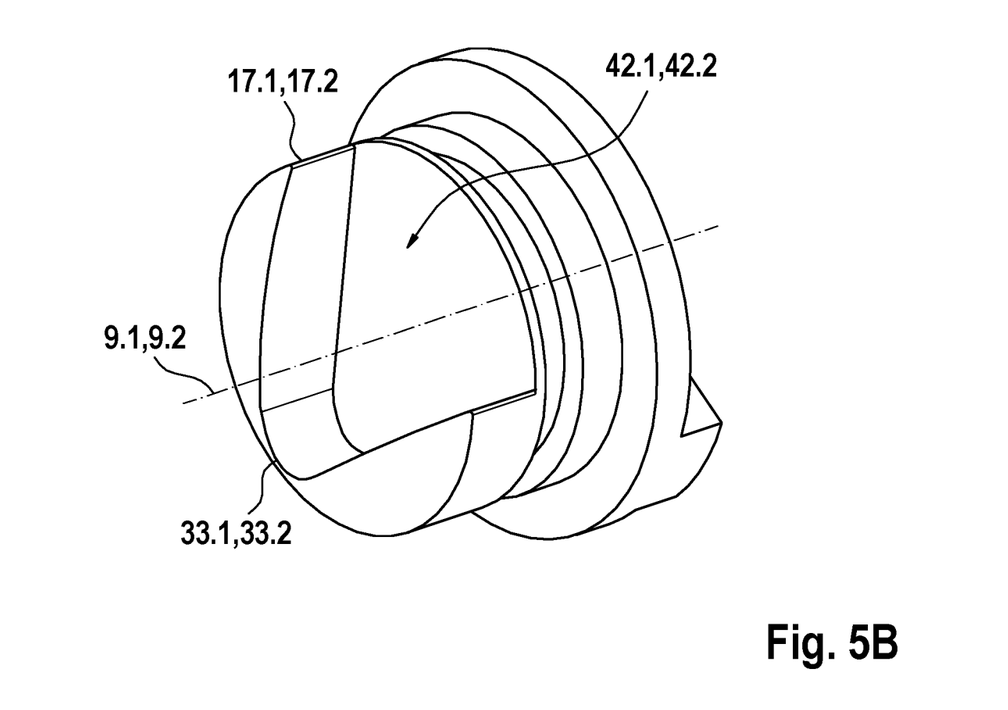

The first locking elements 27.1/27.2 and the second locking elements 34.1/34.2 form connection partners which can generally form a coding, i.e. a type of key/lock connection. In the embodiment, the key/lock connection is defined by the spring element 29.1/29.2 which is flat and engages precisely in the associated slot-shaped first groove 30.2/30.1. For example, a key/lock connection can also be formed in that the second locking element 34.1/34.2 has a double groove 41.1/41.2 with parallel continuous parallel grooves introduced into the valve shaft 17.1/17.2, as is shown in FIG. 5A. This connection includes two suitable spring elements, not shown, which are arranged in parallel on the drive shaft 16.1/16.2 as well as a second groove or recess of the second locking element, not shown, for alignment with the groove 41.1/41.2. FIG. 5B also shows an example of a key/lock connection. Here the second locking element has a triangular-shaped groove 42.1/42.2 configured in the valve shaft 17.1/17.2, a stop abutment 33.1/33.2 being formed there by a connecting ligament wall of the triangular-shaped groove 42.1/42.2. This connection includes a correspondingly formed spring element, not shown, of the drive shaft 16.2/16.1 as well as a second groove or recess, not shown, of the second locking element for alignment with an open side of the groove 42.1/42.2.

In each case, the drive shaft 16.1/16.2 and the valve shaft 17.1/17.2 are offset by 180° on the transverse circumference of the coupling half 2.1/2.2. A mirror-image identity of the two coupling halves 2.1/2.2 in respect of the separating plane 39 is achieved which makes the spatial arrangement of the drive devices 10.1/10.2 and thus of the locking connections 13.1/13.2 particularly favourable and simplifies handling of the coupling halves 2.1/2.2 for connecting, as is shown in FIGS. 1 to 4B. However, the peripheral offset of the drive shaft and the valve shaft on the circumference of each one of the two coupling halves is not limited to 180°. The drive shaft and the valve shaft on one coupling half in each case need not be in a vertical plane, however, the peripheral offset of the coupling halves associated with the fluid coupling must be provided with identical peripheral angles in the opposite direction.

Each coupling half 2.1/2.2 is equipped with a coupling means 11.1/11.2 in such a manner that, for joining to each other in the line of the coupling axis 4, the two coupling halves 2.1/2.2 can be drawn together with their coupling sides 5.1/5.2 by means of relative rotational movement about the coupling axis 4 to create a clamping connection or can be released. For example, customary connecting parts, not shown, of a bayonet-type coupling connection can be provided as coupling means. A particular embodiment of the invention, however, consists in that, as shown in FIGS. 1 to 4B, in each case the drive connection piece 14.1/14.2 of the drive device 10.1/10.2 of each coupling half 2.1/2.2 in the shape of a single coupling dog 18.1/18.2 forms a component of the coupling means 11.1/11.2.

The coupling dog 18.1/18.2 has a gripping edge 19.1/19.2 which releasably engages behind an associated radial projection 20.2/20.1 on the coupling housing 3.2/3.1 of the respective other coupling half 2.2/2.1 for releasably connecting while clamping the coupling sides 5.1/5.2 to one another. Reciprocally, the gripping edge 19.1/19.2 and the radial projection 20.2/20.1 in each case form a dog connection pair and can be engaged and correspondingly disengaged by the relative rotational movement of the two coupling halves 2.1/2.2 about the coupling axis 4. On each coupling half 2.1/2.2, the radial projection 20.1/20.2 is formed by a rear base edge 23.1/23.2 of a housing base 22.1/22.2, directed away from the coupling side 5.1/5.2, which accommodates the valve shaft 17.1/17.2 in a recessed position.

Each of the two dog connection pairs is centred conically, the gripping edge 19.1/19.2 and the associated radial projection 20.2/20.1 being directed backwards, transversely to the coupling axis 4 and obliquely outwards and, pointing away from the coupling side 5.1/5.2, and fit snugly into each other. One advantage of the conical centring is that the coupling halves 2.1/2.2 are thus connected particularly rigidly and are fixed radially to each other so that they cannot be moved. A further means for centring the connection of the coupling halves 2.1/2.2, whereby in particular the design of the coupling means 11.1/11.2 is only optimised with the two coupling dogs 18.1/18.2, consists in that a housing outer edge 24.1/24.2 is formed in each case on the dome-side end of the one coupling housing 3.1/3.2, which housing outer edge fits snugly into a complementary inner edge 25.2/25.1 of the drive connection piece 14.2/14.1 arranged on the other coupling housing 3.2/3.1, as can be seen in particular from FIG. 1.

As is particularly obvious from FIGS. 2, 3A and 4A, each drive connection piece 14.1/14.2 and thus each coupling dog 18.1/18.2 is generally formed by a flat surface segment which extends in the circumferential direction transversely to the housing axis 35.1/35.2 at least approximately over a quarter of the cylindrical circumference of the coupling housing 3.1/3.2 or the fluid coupling 1. The surface segment is associated with a corresponding free peripheral region 26.1/26.2 outside on the coupling housing 3.2/3.1 on the respective other coupling half 2.2/2.1. On the one hand, these surface segments achieve that the coupling dog 18.1/18.2 is a particularly flat but nevertheless highly loadable component for coupling, and on the other hand, the coupling halves 2.1/2.2 can be joined to each other, guided in a special manner.

To establish the locking connection 13.1/13.2 according to the invention, the coupling halves 2.1/2.2 are positioned such that the surface segments of the coupling dogs 18.1/18.2 are pushed in each case into a space formed by the free peripheral region 26.1/26.2 between the drive connection piece 14.1/14.2 and the housing base 22.1/22.2 until the coupling side 5.1/5.2 touch each other in the separating plane 39. In the process, the two drive shafts 16.1/16.2 are located at a peripheral distance of 90° or approximately 90°. The guidance generally arises in that, when the two coupling halve 2.1/2.2 are pushed together, axis-parallel flanks or edges 43.1/43.2 of the drive connection pieces 14.1/14.2 are in sliding contact with each other for positioning the coupling halves 2.1/2.2. When the coupling sides 5.1/5.2 abut against each other, in each case the locking means 27.1/27.2 and 34.2/34.1 are then in the aligned position in their connection plane 44.1/44.2, such that the two coupling halves can be placed comfortably in their coupling connection position by rotating them about the coupling axis 4 until the abutment stops 33.1/33.2 are reached. Torques transmitted in each case via the actuating means 36.1/36.2 can be transferred in each case from the one coupling half 2.1 to the other coupling half 2.2 for reciprocal rotary driving of the rotary bodies 7.1/7.2 of the rotary valves 6.1/6.2. While in each case the non-rotatable axial shaft assembly of drive shaft 16.1/16.2 and valve shaft 17.2/17.1 is rotated, the spring element 29.1/29.2 is captive in the recess of the valve shaft 17.1/17.2 forming the chamber.

As described, the drive devices 10.1/10.2 and locking connections 13.1/13.2 with the locking elements 27.1/27.2 and 34.1/34.2 according to the invention do not only connect the drive shafts 16.1/16.2 to the valve shafts 17.2/17.1 in the fluid coupling 1. At the same time, they generally form securing means 12.1/12.2 which block the relative rotational movement of the coupling halves 2.1/2.2 about the coupling axis 4 for securing the coupling connection when at least one rotary valve 6.1/6.2 is open, while the first locking element 27.1/27.2 is captive in the chamber-like recess of the second locking element 34.2/34.1, and which also secure the closing of the two rotary valves 6.1/6.2 for disconnecting and correspondingly for connecting the coupling halves 2.1/2.2 in that the rotational movement of the coupling halves 2.1/2.2 about the coupling axis 4 is only enabled when the rotary valves 6.1/6.2 are both closed, the first locking element 27.1/27.2 in each case aligning with a part of the second locking element 34.2/34.1 in the circumferential direction.

In general, in each case the design or size of the fluid passage 8.1/8.2 of the rotary body 7.1/7.2 in the associated rotary valve 6.1/6.2 and the associated locking connection 13.1/13.2 are advantageously adapted to one another in such a manner that the rotary valve 6.1/6.2 remains closed at least up to a switching angle of 10°. The switching angle is the angle by which the rotary body 7.1/7.2 can be rotated about its valve axis 9.1/9.2 from the rotational position, when there is free relative rotational movement of the coupling halves, to open the rotary valve 6.1/6.2. The rotary valve 6.1/6.2 is fully open at a switching angle of 90°.

The invention claimed is:
1. A fluid coupling comprising:
   two coupling halves which are releasably connected on their coupling sides, each coupling half having a coupling housing, being equipped with a rotary valve, being aligned along a coupling axis, and being formed correspondingly similar to each other in such a manner that each of said rotary valves has a rotary body mounted on the coupling housing so as to be rotatable about a valve axis, which is directed transversely to the coupling axis, and a fluid passage which traverses said rotary body, said fluid passage closing and opening the rotary valve depending on controllable rotational positions of the rotary body about the valve axis, in that a drive device, which is associated in each case with of the rotary bodies for controlling rotational position, is arranged on each of said coupling halves, in that each of said coupling halves is equipped with a coupling means which connects the coupling halves, it being possible for the connection to be established releasably for uncoupling and conversely for coupling by relative rotational movement of the coupling halves about the coupling axis, and in that the coupling halves have securing means which block the relative rotational movement for securing the connection of the coupling halves when at least one rotary valve is open and which secure the closure of the two rotary valves for disconnecting and correspondingly for connecting the coupling halves;

wherein the drive device, which is arranged separately on each of the coupling halves halves, has a drive shaft which is associated in each case with a valve shaft of the rotary body of the rotary valve of the other coupling half, whereby in each case, a locking connection is configured which, when the coupling halves are connected to each other, connects the respective drive shaft on the one coupling half to the respective valve shaft on the other coupling half in a non-rotatable and releasable manner such that the rotational position of the rotary body of the other coupling half is controllable thereby and the relative rotational movement of the coupling halves about the coupling axis is blocked but the relative rotational movement when the rotary valves are closed is permitted.

2. The fluid coupling according to claim 1, wherein in each case the drive device on the one coupling half has a drive connection piece fixed to the coupling housing, which the drive connection piece rotatably supports the drive shaft about a drive axis that is directed transversely to the housing axis of the coupling half, and in that the valve shaft is exposed outside on the coupling housing of the other coupling half for driving the rotation of the rotary body of the associated rotary valve, wherein the drive shaft and the valve shaft, which are each components of the same coupling housing, are arranged offset at a peripheral angle to each other, wherein in each case the drive connection piece supporting the drive shaft, which the drive connection piece is fixed to the one coupling housing, protrudes so far beyond the other coupling housing on the outside that the locking connection is configured there when the two coupling halves are releasably connected.

3. The fluid coupling according to claim 2, wherein in each case of said coupling half the drive connection piece of the drive device of the one coupling half is configured as a coupling dog, forming a component of the coupling means, with a gripping edge which releasably engages behind an associated radial projection on the coupling housing of the other coupling half to releasably connect the coupling halves while clamping the coupling sides to one another, wherein the gripping edge and the radial projection form a dog connection pair and can be engaged and correspondingly disengaged by the relative rotational movement of the two coupling halves about the coupling axis.

4. The fluid coupling according to claim 3, wherein for centering the connection of the coupling halves each of the dog connection pairs is centered conically, wherein the gripping edge and the associated radial projection are directed backwards, transversely to the coupling axis and obliquely outwards and, pointing away from the coupling side, wherein fit the gripping edge and the associated radial projection fit snugly into each other.

5. The fluid coupling according to claim 3, wherein in each case of said coupling half the drive connection piece of the one coupling half is formed by a surface segment which extends over a quarter of a cylindrical circumference of the fluid coupling and which is associated with a corresponding free peripheral region on the outside of the coupling housing to establish the connection of the coupling halves to the respective other coupling half.

6. The fluid coupling according to claim 5, wherein in each case of said coupling half the surface segment of the one coupling half is concentric with a circular cylinder outer surface of the coupling housing of the other coupling half.

7. The fluid coupling according to claim 5, wherein in each case of said coupling half the locking connection is formed by a positive-fit connection to connection partners forming locking elements which are arranged on the drive device and the rotary body associated with the drive.

8. The fluid coupling according to claim 7, wherein the connection partners of the positive-fit connection are formed by at least one spring element as well as, associated therewith, at least one first groove which is non-rotatably connected to the rotary body associated with the locking connection, wherein the at least one spring element is held captive in the at least one first groove when the coupling halves are connected and locked against their relative rotational movement.

9. The fluid coupling according to claim 8, wherein the connection partners of the positive-fit connection have at least one second groove which is aligned with the at least one first groove only in a rotational position of the at least one first groove which pertains to the closed position of the associated rotary valve, wherein the at least one spring element can be guided through the at least one aligned second groove to leave and to establish the captive holding connection and thus to enable the relative rotational movement of the coupling halves.

10. The fluid coupling according to claim 9, wherein the locking connection in each case of said coupling half is formed with a stop abutment which limits the relative rotational movement of the coupling halves about the coupling axis in a defined manner.

11. The fluid coupling according to claim 10, wherein in each case of said coupling half the fluid passage of the rotary body of the associated rotary valve and the associated locking connection are adapted to one another in such a way that the rotary valve is closed at least up to a switching angle of 10°, wherein the switching angle is the angle by which the rotary body can be rotated about its valve axis from the rotational position, when there is free relative rotational movement of the coupling halves, to open the rotary valve.

12. The fluid coupling according to claim 11, wherein the rotary valves of the two coupling halves are plug valves.

13. The coupling half of the fluid coupling, of the one of the two coupling halves of the fluid coupling according to claim 1, wherein the coupling half, which has the coupling housing with coupling side and housing axis, is an independent coupling part for making the fluid coupling with the other one of the two coupling halves and wherein the other coupling half has the rotary valve with the rotary body rotatably supported on the coupling housing, the fluid passage passing through the rotary body and the rotational position of which is controllable for opening and closing of the fluid passage and thus of the rotary valve, wherein the drive device is arranged and configured on the coupling half which the drive device has the drive shaft for controlling the drive connection and the securing means to the valve shaft of the rotary body of the rotary valve of the other coupling half, and in that the rotary valve belonging to the coupling half has the valve shaft exposed on the outside of the coupling housing for the drive connection and the securing means to the other drive device of the other coupling half of the two coupling halves.

14. The coupling half according to claim 13, wherein the drive device has the drive connection piece fixed to the coupling housing, which drive connection piece protrudes in front of the coupling side parallel to the housing axis and supports the drive shaft.

15. The coupling half according to claim 14, wherein the drive shaft and the valve shaft are arranged on the circumference of the coupling half offset by 180°.

16. The coupling half according to claim 15, wherein the coupling dog of the coupling half is a component of the drive device, wherein the coupling dog is configured to establish a coupling connection together with the corresponding coupling dog of the other coupling half.

17. The coupling half according to claim 16, wherein a housing base, which accommodates the valve shaft of the rotary body, is formed outside on the coupling housing and has a base edge which is formed for engaging with a gripping edge of the coupling dog of the other coupling half.

18. The coupling half according to claim 17, wherein the drive shaft of the controlling drive device has a first locking element which can be non-rotatably connected to the valve shaft of the rotary body of the rotary valve of the relevant coupling half for rotational movement, it being possible to place the locking element in a defined rotational position closing the rotary valve, only in which a locking connection to the valve shaft of the corresponding coupling half can be established and released, and in that the valve shaft of the rotary body of the rotary valve of the coupling half has a second locking element which is configured with the one of the first locking element of the corresponding coupling half to produce a locking connection, which opens the rotary valve, is at the same time captive, and can only be released when the rotary valve is closed.

19. The coupling half according to claim 18, wherein the second locking element has at least one first groove for establishing a positive-fit connection to the first locking element of the corresponding coupling half, which groove is formed on the valve shaft rotatably supporting the rotary body on the coupling housing, and is exposed on the outside of the coupling housing.

20. The coupling half according to claim 19, wherein the second locking element has at least one second groove which is configured on the coupling housing, exposed on the outside, as a groove directed transversely to the housing axis and is only aligned with the at least one first groove in a rotational position of the valve shaft.

\* \* \* \* \*

UNITED STATES PATENT AND TRADEMARK OFFICE
CERTIFICATE OF CORRECTION

PATENT NO. : 11,867,333 B2
APPLICATION NO. : 15/734739
DATED : January 9, 2024
INVENTOR(S) : Hauke Peter Hamkens, Jan-Oliver Sylla and Eugen Schwarz It is certified that error appears in the above-identified patent and that said Letters Patent is hereby corrected as shown below:

In the Specification

At Column 10, Line 38:
a connecting ligament wall of the triangular-shaped groove Should be:
--a connecting wall of the triangular-shaped groove--

Signed and Sealed this
Twenty-third Day of April, 2024

Katherine Kelly Vidal
*Director of the United States Patent and Trademark Office*